United States Patent
Park et al.

(10) Patent No.: US 8,457,070 B2
(45) Date of Patent: Jun. 4, 2013

(54) METHOD FOR PERFORMING INTER-RAT HANDOVER

(75) Inventors: Gi Won Park, Anyang-si (KR); Yong Ho Kim, Inchen-si (KR); Jin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 380 days.

(21) Appl. No.: 12/867,213

(22) PCT Filed: Mar. 9, 2009

(86) PCT No.: PCT/KR2009/001158
§ 371 (c)(1),
(2), (4) Date: Aug. 11, 2010

(87) PCT Pub. No.: WO2009/113782
PCT Pub. Date: Sep. 17, 2009

(65) Prior Publication Data
US 2011/0002305 A1      Jan. 6, 2011

(30) Foreign Application Priority Data

Mar. 14, 2008   (KR) .................. 10-2008-0023865
Jul. 14, 2008   (KR) .................. 10-2008-0068208

(51) Int. Cl.
*H04W 4/00* (2009.01)
(52) U.S. Cl.
USPC .......................................... 370/331; 455/436
(58) Field of Classification Search
USPC ............... 370/329, 330, 331, 332, 333, 334, 370/335, 336, 337, 338; 455/436, 437, 438, 455/439, 440, 442, 450, 452.2
See application file for complete search history.

(56) References Cited

U.S. PATENT DOCUMENTS

| | | | |
|---|---|---|---|
| 2003/0218995 A1 | 11/2003 | Kim et al. | |
| 2004/0196808 A1* | 10/2004 | Chaskar et al. | 370/331 |
| 2006/0229075 A1* | 10/2006 | Kim et al. | 455/436 |
| 2008/0014941 A1* | 1/2008 | Catovic et al. | 455/436 |
| 2008/0014957 A1* | 1/2008 | Ore | 455/452.1 |
| 2009/0034526 A1* | 2/2009 | Ahmadi et al. | 370/392 |

FOREIGN PATENT DOCUMENTS

| | | |
|---|---|---|
| EP | 1257141 A1 | 11/2002 |
| WO | WO 2006/056882 A1 | 6/2006 |

* cited by examiner

*Primary Examiner* — Dady Chery
(74) *Attorney, Agent, or Firm* — Birch, Stewart, Kolasch & Birch, LLP

(57) ABSTRACT

An Inter-RAT handover method is disclosed. A method for supporting an Inter-RAT handover by an IEEE 802.16m MS includes performing, by the MS, pre-registration in an Inter-RAT target BS using a tunneling, if a channel quality of an Inter-RAT neighbor cell is higher than a pre-registration threshold, and transmitting a handover request message for a handover to the target BS to a serving BS, if a channel quality of the neighbor cell is equal to or higher than a handover threshold during a time duration in a scanning of the neighbor cell and a channel quality of the target BS is equal to or higher than that of the neighbor cell. This handover method reduces a time required for a handover from an IEEE 802.16m network to a Non-802.16m network, provides a seamless service, supports a rapid recovery in case of a radio link failure, and increases handover reliability.

9 Claims, 10 Drawing Sheets

METHOD FOR PERFORMING INTER-RAT HANDOVER

TECHNICAL FIELD

FIG. 1 is a flow chart illustrating a method for performing an IEEE 802.16e Intra-handover procedure.

Referring to FIG. 1, if a mobile station (MS) is powered on, the MS searches for a serving cell, and selects a cell at step 1. Next, the MS having selected the cell establishes downlink synchronization with a base station (BS), and obtains uplink (UL) and downlink (DL) parameters at steps 2 and 3. The MS performs a ranging process with the BS, and adjusts the uplink (UL) parameters along with the BS at step 4. Next, the MS negotiates basic capabilities with the BS at step 5. The MS exchanges authorization-associated key values with the BS to perform MS authorization at step 6.

If the above-mentioned steps have been successfully carried out, the registration process with the BS is carried out at step 7. Otherwise, the MS searches for another appropriate cell at step 1.

Next, the MS establishes IP connectivity, and transfers additional parameters needed for communication at steps 8 and 9. The MS establishes connections to the BS in order to communicate with the BS at step 10, and communicates with the BS via the established connections at step 11.

If the MS has a specific threshold value which is equal to or less than a channel quality of a serving cell during the communication step 11, it searches for another cell (i.e., Cell Reselection) having a channel quality superior to that of the serving cell at step 12.

At step 13, the MS selects the best cell among neighbor cells, each of which has a channel quality superior to that of the serving cell at the above step 12. At step 14, the MS is handed over to another cell selected at the above step 13.

After the MS is handed over to another cell, it performs steps from the synchronization step 2 to the connection establishment step 10 along with a new BS at steps 15~17. If the steps 15~17 are not normally carried out along with a target base station, the MS searches for a new target cell at step 18a. If the steps 15~17 are completed, the MS negotiates basic capabilities with a new BS at step 18.

Finally, the MS communicates with the BS at step 19, and establishes a new IP connectivity with the BS at step 20.

However, the IEEE 802.16e supports only an Intra-RAT handover without supporting an Inter-RAT handover. However, the IEEE 802.16m standard needs to support an Inter-RAT handover of the MS.

DISCLOSURE

Technical Problem

An object of the present invention devised to solve the problem lies on a resource scheduling method for efficiently combining scheduling of an FSS scheme and scheduling of an FDS scheme.

Technical Solution

An object of the present invention is to provide an Inter-RAT handover method for reducing a time required for a handover from an IEEE 802.16m network to a Non-802.16m network, providing a seamless service, supporting a rapid recovery in case of a radio link failure, and increasing a reliability of the handover.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for supporting an Inter-RAT handover by an IEEE 802.16m mobile station comprises: performing, by the mobile station, a pre-registration in a target base station of an Inter-RAT using a tunneling, if a channel quality value of an Inter-RAT neighbor cell is higher than a pre-registration threshold value; and transmitting a handover request message for a handover to the target base station to a serving base station, if a channel quality value of the Inter-RAT neighbor cell is equal to or higher than a handover threshold value during a time duration in a scanning of the Inter-RAT neighbor cell and a channel quality value of the target base station is equal to or higher than that of the Inter-RAT neighbor cell.

The method may further comprise: transmitting a handover indication message to the serving base station, upon receiving a handover response message in response to the handover request message from the serving base station.

The performing of the pre-registration may include: transmitting a registration request message to the target base station using a tunneling based on a second layer (L2) protocol; and transmitting a registration complete message to the target base station using a tunneling based on a second layer (L2) protocol, upon receiving a registration accept message from the target base station.

The registration request message and the registration complete message are encapsulated with an Inter-RAT extended subheader and an IEEE 802.16m MAC header, wherein the Inter-RAT extended subheader includes an identifier (ID) of the serving base station and an identifier (ID) of the target base station.

The registration accept message is encapsulated with an Inter-RAT extended subheader and an IEEE 802.16m MAC header, wherein the Inter-RAT extended subheader includes an identifier (ID) of the serving base station, an identifier (ID) of the target base station, a dedicated code for an initial access, and system information of the target base station.

The method may further comprise: performing an initial access to the target base station using the dedicated code, if radio resources and a bearer of the IEEE 802.16m are released. In this case, the radio resources and the bearer are released at a specific time at which the base station receives a handover indicator (HO_IND) message and a resource retain timer (resource_retain_timer) expires. Therefore, the step for performing the initial access may be earlier than this specific time at which the radio resources and bearer are released.

The method may further comprise: transmitting a handover request message for a handover to a base station having the highest channel quality value to the serving base station, if a channel quality value of the Inter-RAT neighbor cell is equal to or higher than a handover threshold value during a time duration in a scanning of the Inter-RAT neighbor cell and a channel quality value of the target base station is less than that of the Inter-RAT neighbor cell.

In another aspect of the present invention, there is provided a method for supporting an Inter-RAT handover by an IEEE 802.16m mobile station comprising: scanning an Inter-RAT neighbor cell by the mobile station, if a channel quality value of a serving base station is less than a scanning threshold value; performing, by the mobile station, a pre-registration in a target base station of an Inter-RAT using a tunneling if a channel quality value of the Inter-RAT neighbor cell is higher than a pre-registration threshold value; and transmitting a handover request message for a handover to the target base station to the serving base station, if a channel quality value of the Inter-RAT neighbor cell is equal to or higher than a handover threshold value during a time duration in a scanning of the Inter-RAT neighbor cell and a channel quality value of the target base station is equal to or higher than that of the Inter-RAT neighbor cell.

The scanning may include: receiving a neighbor advertisement (MOB_NBR-ADV) message having recommended base station information which is decided by the serving base station on the basis of LBS (Location Based Service) information of the mobile station, from the serving base station; and scanning an Inter-RAT neighbor cell of the recommended base station information.

The recommended base station information may include an identifier (ID) of a neighbor base station for each RAT ID.

The performing of the pre-registration may include: transmitting a registration request message to the target base station using a tunneling based on a second layer (L2) protocol; and transmitting a registration complete message to the target base station using a tunneling based on a second layer (L2) protocol, upon receiving a registration accept message from the target base station.

The registration request message and the registration complete message are encapsulated with an Inter-RAT extended subheader and an IEEE 802.16m MAC header, wherein the Inter-RAT extended subheader includes an identifier (ID) of the serving base station and an identifier (ID) of the target base station.

The registration accept message is encapsulated with an Inter-RAT extended subheader and an IEEE 802.16m MAC header, wherein the Inter-RAT extended subheader includes an identifier (ID) of the serving base station, an identifier (ID) of the target base station, a dedicated code for an initial access, and system information of the target base station.

It is to be understood that both the foregoing general description and the following detailed description of the present invention are exemplary and explanatory and are intended to provide further explanation of the invention as claimed.

Advantageous Effects

The present invention allows the MS to perform pre-registration in a target base station before the MS is handed over from an IEEE 802.16m network to a Non-802.16m network, such that it reduces a time required for a handover, provides a seamless service, supports a rapid recovery of a radio link failure, and increases a handover reliability.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

In the drawings.

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts. Embodiments of the present invention will hereinafter be described with reference to the annexed drawings. The following embodiments of the present invention may be modified into various formats, and the scope of the present invention is not limited to only the following embodiments and can also be applied to other examples.

The embodiments of the present invention provide a method for performing a handover from an IEEE 802.16m network to a Non-802.16m network. In more detail, the present invention provides a method for performing pre-registration in a target base station using an L2 signal tunneling before a mobile station performs an Inter-RAT handover.

Figure 1:
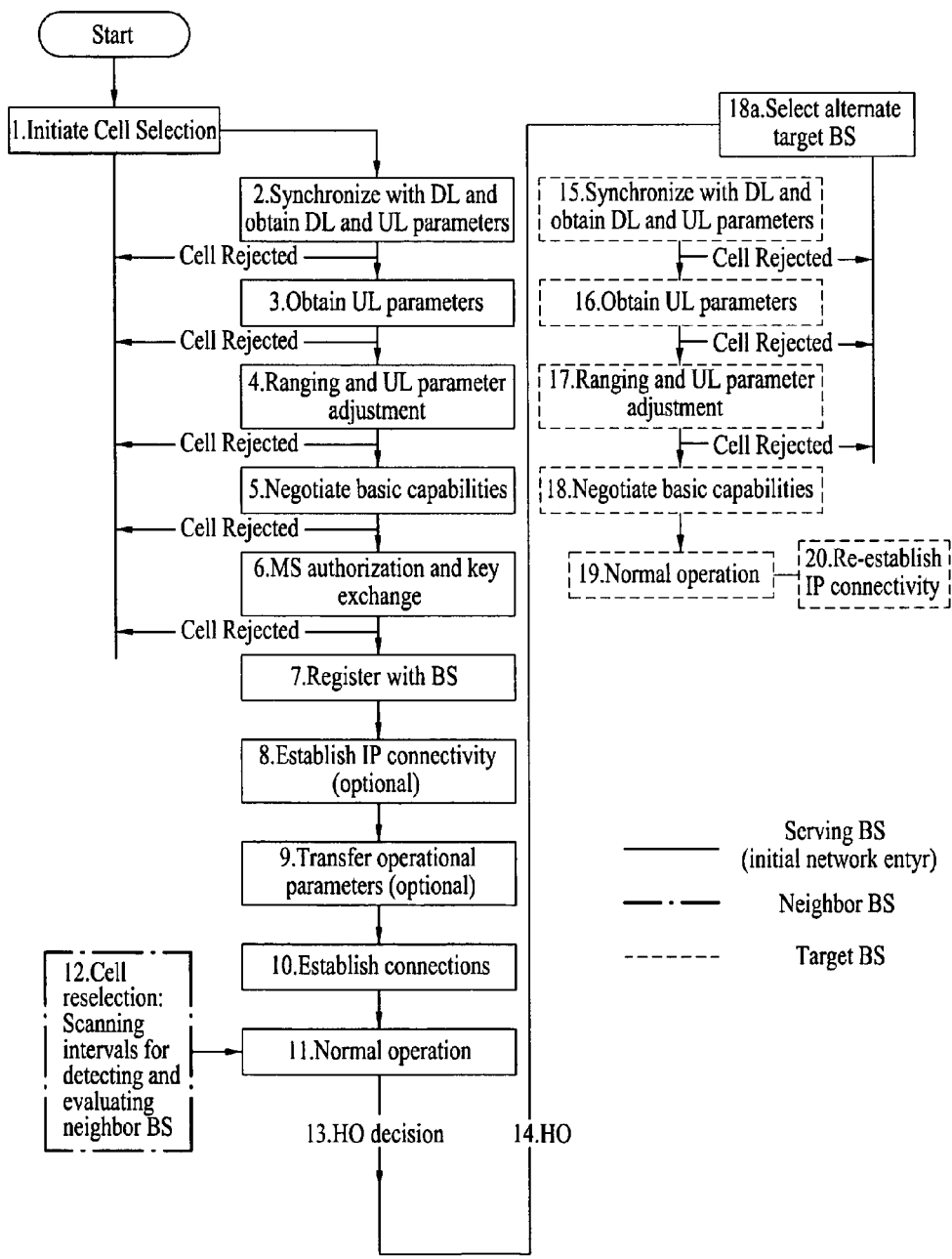
FIG. 1 is a flow chart illustrating a method for performing an IEEE 802.16e Intra-handover procedure.
Figure 2:
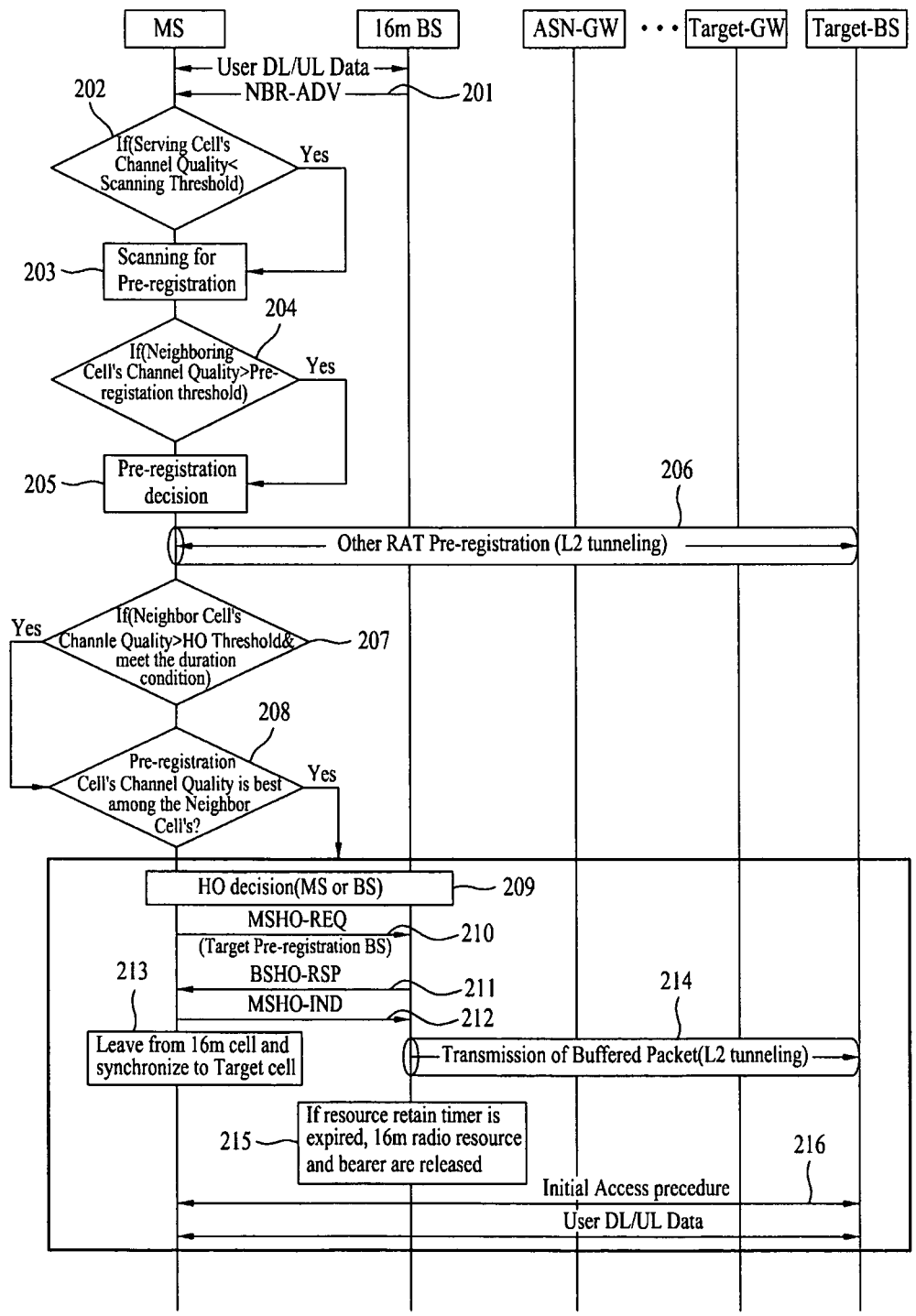
FIG. 2 is a flow chart illustrating an Inter-RAT handover method according to the present invention.

FIG. 2 is a flow chart illustrating a method for allowing a mobile station (MS) to perform an Inter-RAT handover from an IEEE 802.16m network to a Non-802.16m network according to the present invention.

Referring to FIG. 2, the mobile station (MS) periodically receives a neighbor advertisement (MOB_NBR-ADV) message including Inter-RAT neighbor cell information from a serving base station (i.e., 16m BS), at step 201.

If a channel quality of a serving cell is equal to or less than an Inter-RAT scanning threshold value at step 202, the mobile station (MS) scans an Inter-RAT neighbor cell at step 203. That is, the mobile station (MS) transmits a scanning request message (MOB_SCN-REQ) to the serving base station in order to perform the scanning, receives a scanning response message (MOB_SCN-RSP) from the serving base station in response to the MOB_SCN-REQ message, checks a recommended cell contained in the received message, and scans an Inter-RAT neighbor cell. In this case, the recommended cell is a list of optimum Inter-RAT neighbor cells, which are decided by the serving base station on the basis of LBS (Location Based Service) information received from the mobile station (MS) and they will be scanned by the mobile station (MS).

If a channel quality of an Inter-RAT neighbor cell is higher than a pre-registration threshold value while the mobile station (MS) scans the Inter-RAT neighbor node at step 204, the MS determines a specific cell having the best channel quality among scanned Inter-RAT cells to be a target cell where pre-registration will be carried out at step 205.

The mobile station (MS) performs pre-registration in the target base station (Target-BS) decided by the mobile station (MS) via an L2 tunneling at step 206.

If a channel quality of each Inter-RAT neighbor cell is equal to or higher than an Inter-RAT handover threshold value at step 207 while the mobile station (MS) continues to scan Inter-RAT neighbor cells after performing the pre-registration, the MS determines whether or not a channel quality of the pre-registered cell (i.e., pre-registration cell) is still superior to that of each Inter-RAT neighbor cell at step 208.

In this case, in the case where the channel quality of the pre-registered cell is still superior to that of the Inter-RAT neighbor cell and at the same time a channel quality of the Inter-RAT neighbor cell is equal to or higher than a handover threshold value during a predetermined time duration, the mobile station (MS) decides to perform a handover to the pre-registered cell at step 209. Otherwise, the base station may confirm contents of an MOB_SCN-REP message transferred from the mobile station (MS) in the scanning process, such that it may determine whether to perform a handover. In this case, the base station transmits a handover request message (MOB_BSHO-REQ) to the mobile station (MS).

The mobile station (MS) transmits a handover request message (MOB_MSHO-REQ) to the serving base station in order to be handed over to the pre-registered base station at step 210. The serving base station transmits a handover response message (MOB_BSHO-RSP) to the mobile station (MS) in response to the MOB_MSHO-REQ message at step 211. The serving base station is able to begin to buffer data upon receipt from the MOB_MSHO-REQ message.

Next, the mobile station (MS) recognizes the handover message (MOB_MSHO-RSP) having been received from the base station, determines whether to perform a handover to a target base station, and transmits a handover indication message (MOB_HO-IND) to the base station (i.e., 16 m BS) at step 212. Next, the mobile station (MS) leaves from the serving cell (i.e., 16 m cell), is synchronized with a target cell, and performs an initial access process at step 213.

Upon receiving the MOB_HO-IND message from the mobile station (MS), the serving base station (i.e., 16 m BS) transfers packets stacked in a buffer to a target base station (i.e., Target-BS) via the L2 tunneling at step 214. Alternatively, packets stacked in the buffer may be transferred to the target base station (Target-BS) via an L3 tunneling. Also, after the serving base station receives the MOB_HO-IND message from the mobile station (MS), it begins to drive a resource retain timer. If the resource retain timer has expired, the serving base station releases radio resources and bearer information used for communicating with the mobile station (MS) at step 215.

Finally, the mobile station (MS) attempts to access the target base station (Target-BS) at step 216. Steps from the step 212 at which the MS transmits the MOB_HO-IND message to the other step 216 at which the MS attempts to perform the initial access can be almost simultaneously carried out. After the mobile station (MS) gains access to the target base station (Target-BS), uplink/downlink (UL/DL) user data transmission is carried out between the mobile station (MS) and the target base station (i.e., a current serving base station).

Figure 3:
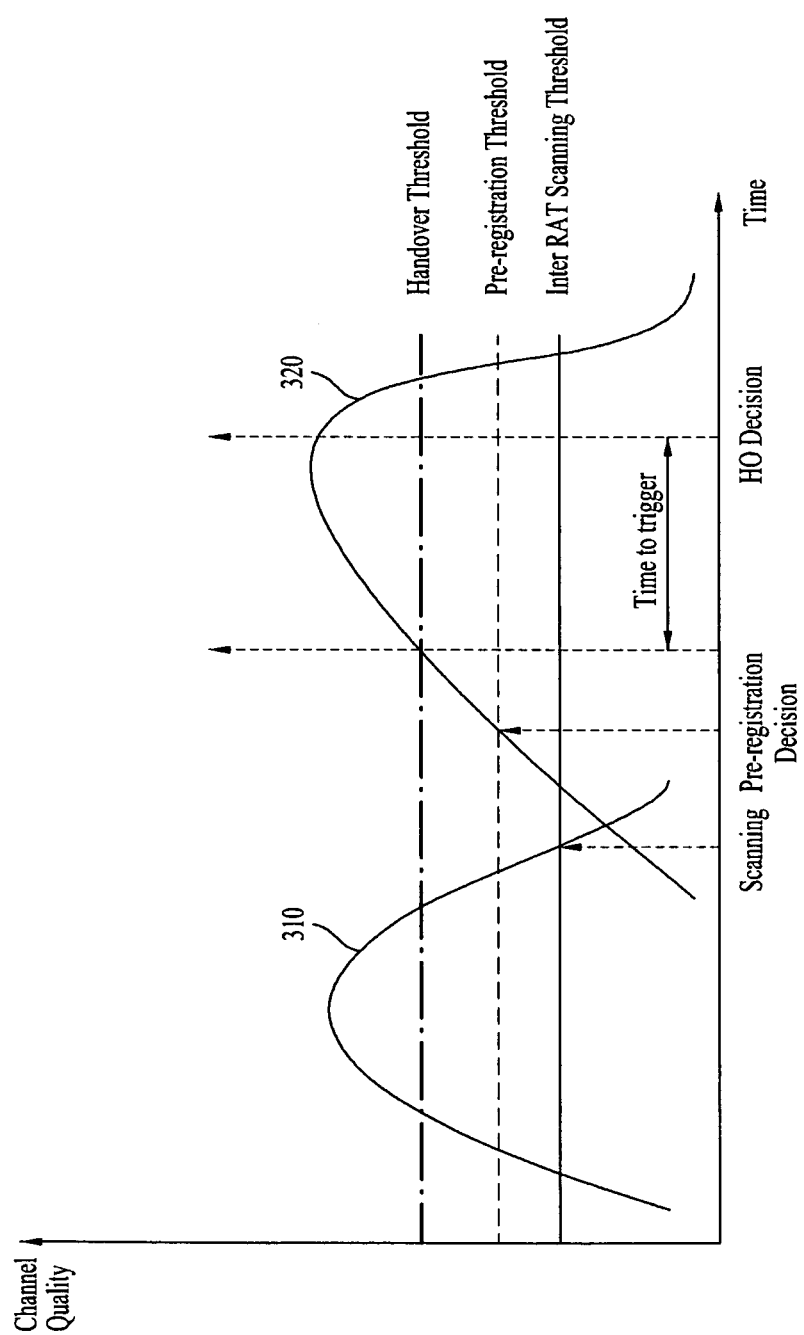
FIG. 3 is a conceptual diagram illustrating a method for performing a scanning, a pre-registration and a handover by a mobile station (MS) of FIG. 2 according to the present invention.

FIG. 3 is a conceptual diagram illustrating a method for performing a scanning, a pre-registration and a handover by the mobile station (MS) of FIG. 2 according to the present invention.

Referring to FIG. 3, if a channel quality 310 of a serving cell is equal to or less than an Inter-RAT scanning threshold value, the mobile station (MS) scans Inter-RAT neighbor cells.

Next, if a channel quality 320 of the scanned neighbor cells is equal to or higher than a pre-registration threshold value, a specific cell having the best channel quality among the neighbor cells, each of which has a channel quality which is equal to or higher than the pre-registration threshold value, is determined to be a target cell where pre-registration will be carried out.

Finally, if a channel quality 320 of each Inter-RAT neighbor cell is equal to or higher than a handover threshold value while the mobile station (MS) continues to scan individual Inter-RAT neighbor cells after performing the pre-registration, the MS determines whether or not a channel quality of the pre-registered cell is still superior to that of each Inter-RAT neighbor cell. In this case, if the channel quality of the pre-registered cell is still superior to that of the Inter-RAT neighbor cell and at the same time a channel quality of the Inter-RAT neighbor cell is equal to or higher than a handover threshold value during a predetermined time duration, the mobile station (MS) decides to perform a handover to the pre-registered cell.

As described above, the mobile station (MS) performs the pre-registration process with the target base station before performing a handover. Accordingly, if a radio link failure occurs between the mobile station (MS) and the serving base station during the handover, the mobile station (MS) can immediately attempt to access the pre-registered cell without scanning Intra-RAT or Inter-RAT neighbor cells. As a result, the mobile station (MS) is able to receive a reliable service.

Also, according to a conventional IEEE 802.16 single network handover, a serving base station having received the MOB_MSHO-REQ message from the mobile station (MS) transmits this MOB_MSHO-REQ message to a core network. That is, the mobile station (MS) transmits MS information to the core network, and receives information needed for a handover from the core network. In order to initially access a target base station, the mobile station (MS) performs a series of operations such as an operation for acquiring DL/UL physical information.

However, according to the embodiments of the present invention, the mobile station (MS) having accessed the IEEE 802.16m system performs a pre-registration process before performing a handover to an Inter-RAT network, such that it pre-performs at least some parts among the series of operations. As a result, the mobile station (MS) may omit processes executed in the pre-registration process when performing the Inter-RAT handover, resulting in the implementation of a rapid handover.

Figure 4:
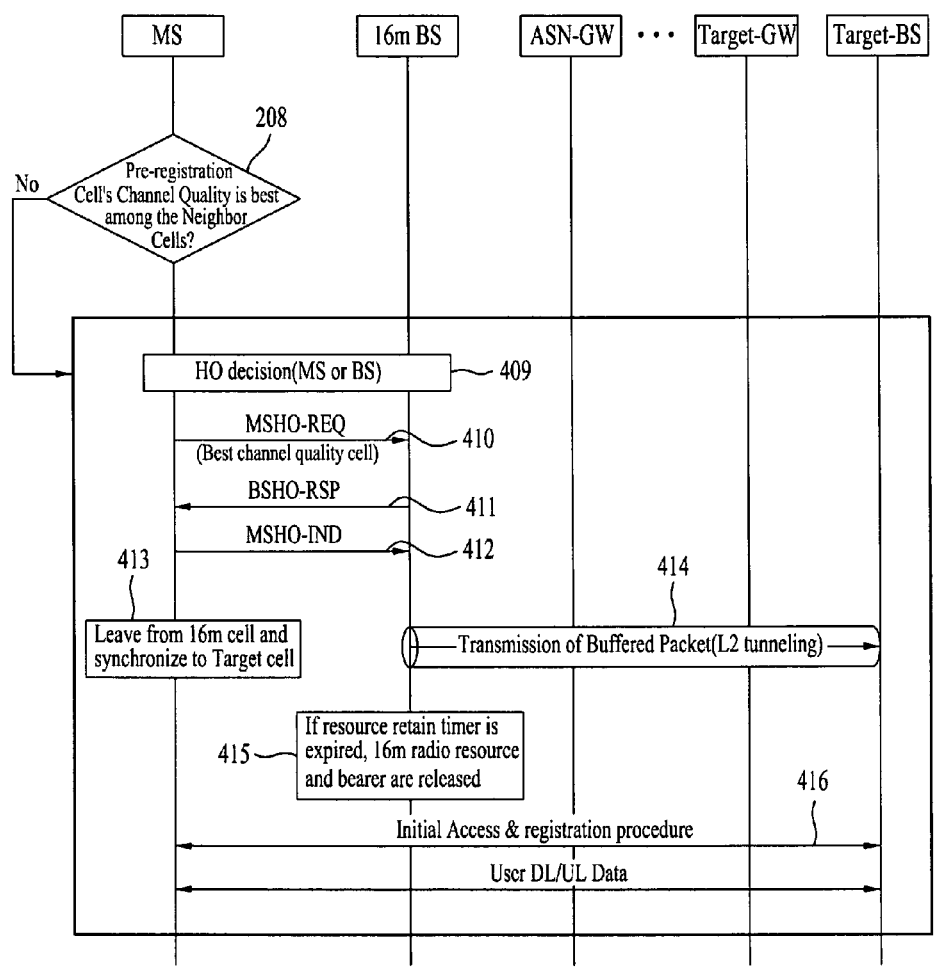
FIG. 4 is a flow chart illustrating mobile station (MS) operations performed when there is a cell having a channel quality superior to that of a pre-registered cell of FIG. 2 according to the present invention.

FIG. 4 is a flow chart illustrating mobile station (MS) operations performed when there is a cell having a channel quality superior to that of a pre-registered cell of FIG. 2.

Referring to FIG. 4, if a specific cell having a channel quality superior to that of the pre-registration cell (i.e., pre-registration cell) exists in neighbor cells at step 208, the mobile station (MS) performs steps described in FIG. 4.

The mobile station (MS) decides to perform a handover to an Inter-RAT neighbor cell having the best channel quality at step 409. Otherwise, the base station is also able to decide whether to perform the handover on the basis of the scanned result.

In order to perform a handover to a target cell, the mobile station (MS) transmits a handover request (MOB_MSHO-REQ) message to the serving base station at step 410. The serving base station transmits a handover response (MOB_B-SHO-RSP) message to the mobile station (MS) in response to the MOB_MSHO-REQ message at step 411. The mobile station (MS) recognizes a handover response (MOB_BSHO-RSP) message received from the base station, determines whether to perform a handover to a target base station, and transmits a handover indication (MOB_HO-IND) message to the base station at step 412.

The mobile station (MS) leaves from a serving cell, and is synchronized with a target cell at step 413. Upon receiving the MOB_HO-IND message from the mobile station (MS), the serving base station (i.e., 16 m BS) transfers packets stacked in a buffer to a target base station (i.e., Target-BS) via the L2 tunneling at step 414. Also, after the serving base station receives the MOB_HO-IND message from the mobile station (MS), it begins to drive a resource retain timer. If the resource retain timer has expired, the serving base station releases radio resources and bearer information used for communicating with the mobile station (MS) at step 415. Finally, the mobile station (MS) attempts to access the target base station (Target-BS) at step 416. Steps from the step 413 at which the MS is synchronized with the target cell to the other step 416 at which the MS attempts to perform the initial access can be almost simultaneously carried out.

FIG. 4 shows an exemplary case in which the mobile station (MS) attempts to access another cell where the pre-registration is not performed. That is, the case of FIG. 4 shows that the mobile station (MS) attempts to access a cell having a channel quality superior to that of the pre-registered cell. Therefore, the mobile station (MS) must perform additional processes (e.g., a registration process with the BS and an authentication process) simultaneously while accessing the target cell. In this case, the additional processes are indicative of at least some processes performed in the pre-registration process of FIG. 2. Next, UL/DL user data transmission of the mobile station (MS) is carried out between the mobile station (MS) and the target base station (i.e., a current serving base station).

Figure 5:
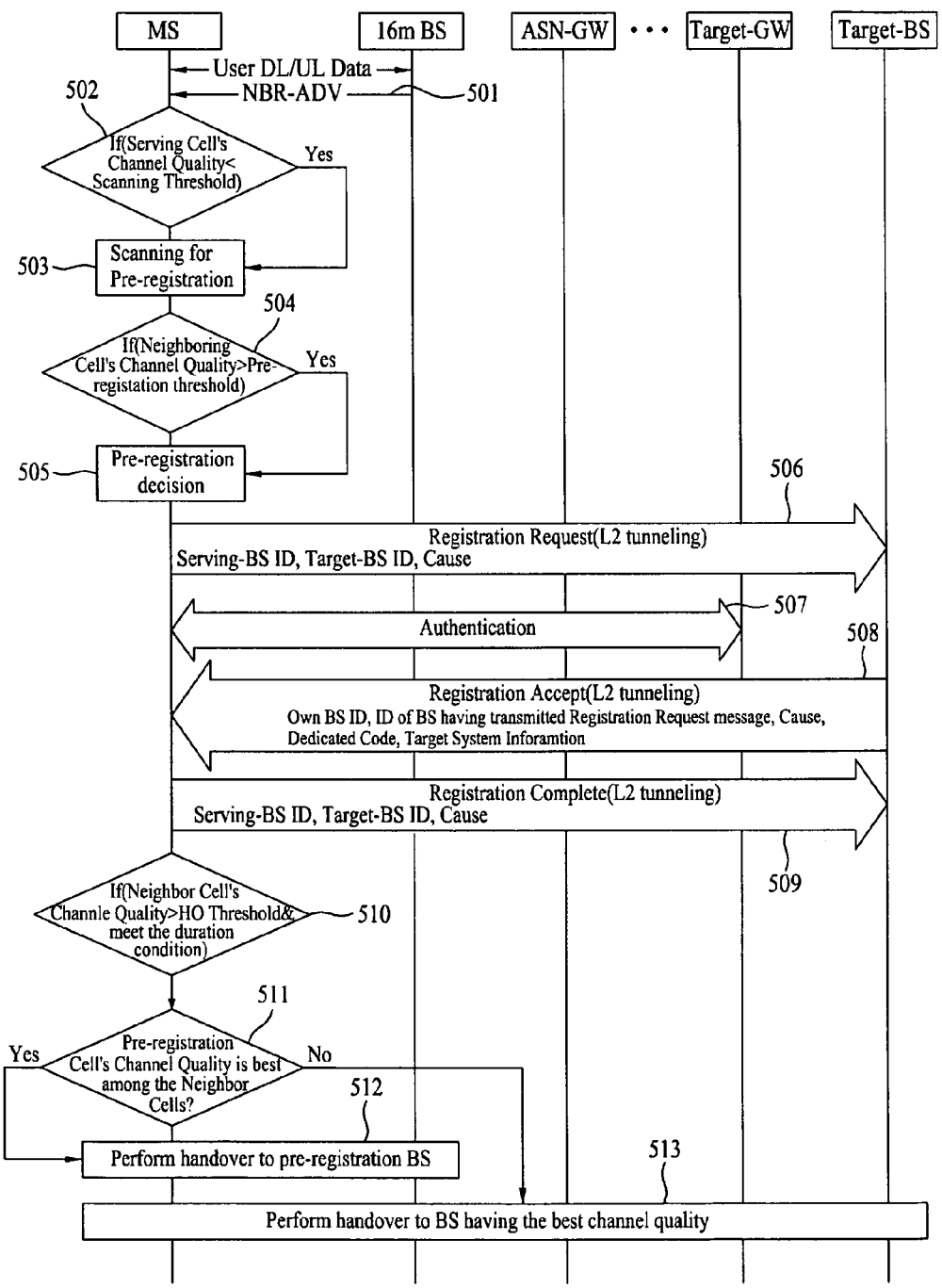
FIG. 5 is a flow chart illustrating a transmission/reception process of an L2 tunneling message when a mobile station (MS) is pre-registered in an Inter-RAT target cell according to the present invention.

FIG. 5 is a flow chart illustrating a transmission/reception process of an L2 tunneling message when a mobile station (MS) is pre-registered from the IEEE 802.16m network to a Non-802.16m target cell according to the present invention. Referring to FIG. 5, the mobile station (MS) receives Inter-RAT neighbor cell information upon receiving an MOB_NBR-ADV message from the serving base station at step 501.

If a channel quality of a serving cell is equal to or less than an Inter-RAT scanning threshold value at step 502, the mobile station (MS) scans an Inter-RAT neighbor cell at step 503. That is, the mobile station (MS) transmits a scanning request message (MOB_SCN-REQ) to the serving base station in order to perform the scanning, receives a scanning response message (MOB_SCN-RSP) from the serving base station in response to the MOB_SCN-REQ message, confirms a recommended base station (i.e., a recommended cell) contained in the received message, and scans an Inter-RAT neighbor cell. In this case, the recommended base station information is a list of optimum Inter-RAT neighbor cells, which are decided by the serving base station on the basis of LBS (Location Based Service) information received from the mobile station (MS) and they will be scanned by the mobile station (MS).

If a channel quality of an Inter-RAT neighbor cell is higher than a pre-registration threshold value while the mobile station (MS) scans the Inter-RAT neighbor cell at step 504, the MS determines a specific cell having the best channel quality among scanned Inter-RAT cells to be a target cell where pre-registration will be carried out at step 505.

Next, the mobile station (MS) encapsulates a registration request message acting as a target signaling message into an IEEE 802.16m message and transmits the encapsulated registration request message to the target cell, where the pre-registration will be carried out, via the L2 tunneling at step 506. The mobile station (MS) adds an Inter-RAT extended subheader to the IEEE 802.16m message, such that it may add a serving-BS ID, a target-BS ID, etc. using the Inter-RAT extended subheader. In this case, when the mobile station (MS) performs a handover after performing the pre-registration, the Inter-RAT extended subheader is used as an extended header field which may be used to request or receive available information to be used for this handover.

The target base station (Target-BS) having received the registration request message transmits specific information needed for MS authentication to a core network. A network entity, which receives the specific information, performs an authentication process by performing the L2 tunneling process with the mobile station (MS) at step 507. If the authentication process has been successfully carried out, the network entity informs the target base station (Target-BS) of the successful authentication process. In order to transmit a registration accept message to the mobile station (MS), the base station prepares the registration accept message which is a response message to the registration request message. Preferably, target DL/UL physical information may be contained in target system information contained in the registration accept message. The target base station (Target-BS) encapsulates the registration accept message into the target signaling message, includes its own BS ID, an IEEE 802.16m BS ID (i.e., an ID of a BS having transmitted the registration request message), a dedicated code, target system information in an Inter-RAT extended subheader field, and transmits the target signaling message to the mobile station (MS) via the L2 tunneling at step 508. In response to the registration accept message, the mobile station (MS) transmits a registration complete message to the target base station (Target-BS) via the L2 tunneling at step 509.

If a channel quality of each Inter-RAT neighbor cell is equal to or higher than a handover threshold value at step 510 while the mobile station (MS) continues to scan individual Inter-RAT neighbor cells after performing the pre-registration, the MS determines whether or not a channel quality of the pre-registered cell is still superior to that of each Inter-RAT neighbor cell at step 511. In this case, in the case where the channel quality of the pre-registered cell is still superior to that of the Inter-RAT neighbor cell and at the same time a channel quality of the Inter-RAT neighbor cell is equal to or higher than a handover threshold value during a predetermined time duration, the mobile station (MS) decides to perform a handover to the pre-registered cell. In this case, the remaining steps of FIG. 5 are equal to steps from the handover (HO) decision step 209 of FIG. 2. In the meantime, if a specific cell which has a channel quality superior to that of the pre-registered cell exists in the channel quality confirmation step 511, the mobile station (MS) performs steps from the handover (HO) decision step 409 of FIG. 4.

Figure 6:
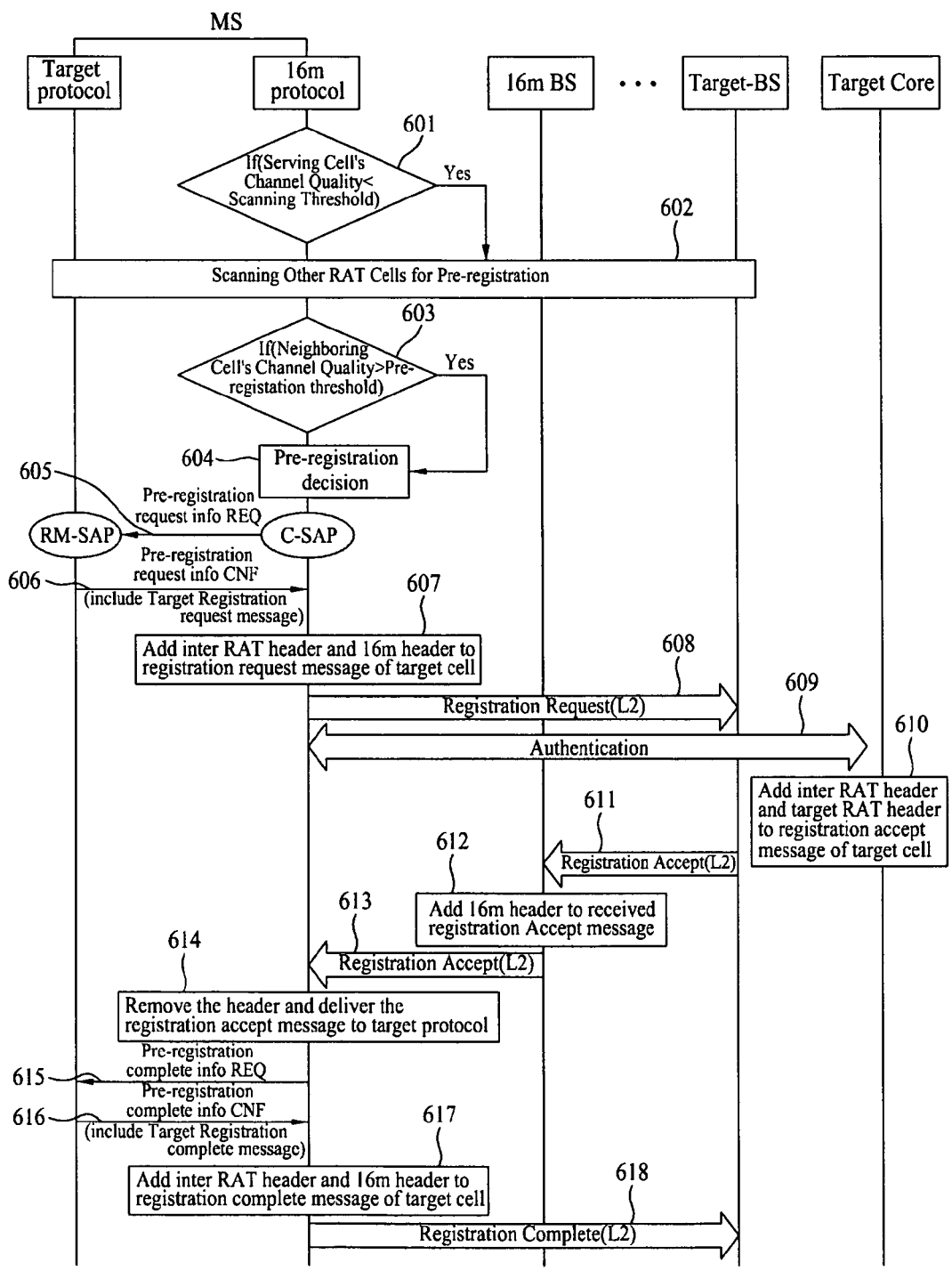
FIG. 6 is a flow chart illustrating a pre-registration process of FIG. 5 according to the present invention.

FIG. 6 is a flow chart illustrating the pre-registration process of FIG. 5 according to the present invention.

Referring to FIG. 6, if a channel quality of a serving cell is equal to or less than an Inter-RAT scanning threshold value at step 601, the mobile station (MS) scans neighbor nodes at step 602. In this case, the mobile station (MS) switches off an IEEE 802.16m radio network and switches on a target RAT radio network, and scans a neighbor cell of a target RAT. The mobile station (MS) transmits a scanning request message (MOB_SCN-REQ) to the serving base station in order to perform the scanning, receives a scanning response message (MOB_SCN-RSP) in response to the MOB_SCN-REQ message, checks a recommended BS contained in the received message, and scans an Inter-RAT neighbor cell. In this case, the recommended BS information is a list of optimum Inter-RAT neighbor cells, which are decided by the serving base station on the basis of LBS (Location Based Service) information received from the mobile station (MS) and they will be scanned by the mobile station (MS).

If a channel quality of an Inter-RAT neighbor node is higher than a pre-registration threshold value while the mobile station (MS) scans the Inter-RAT neighbor node at step 603, the MS determines a specific cell having the best channel quality among scanned Inter-RAT cells to be a target cell where pre-registration will be carried out at step 604.

In order to transmit the registration request message to the target cell, the mobile station (MS) transmits a pre-registration request information REQ primitive to a target RAT protocol at step 605. This primitive is transferred from a 16 m control SAP (i.e., C-SAP) to a target radio management SAP (i.e., RM-SAP). If the pre-registration request information REQ primitive is transferred to a target network protocol, the target network protocol transfers a pre-registration request information CNF primitive including the registration request to the 16 m protocol at step 606.

Next, the mobile station (MS) attaches an IEEE 802.16m MAC header and an Inter-RAT extended subheader to the registration request message at step 607, and transmits the resultant registration request message to the target base station (Target-BS) via the L2 tunneling at step 608.

The target base station (Target-BS) having received the registration request message transmits specific information needed for MS authentication to a core network. A network entity receives the specific information and performs an authentication process along with the mobile station (MS) at step 609. If the authentication process has been successfully carried out, the network entity informs the target base station (Target-BS) of the successful authentication process. Therefore, the base station prepares a registration accept message which is a response message to the registration request message.

In order to transmit the registration accept message to the mobile station (MS), the target base station (Target-BS) attaches a Target RAT MAC header and an Inter-RAT extended subheader to the registration accept message at step 610, and the resultant registration accept message to the mobile station (MS) via the L2 tunneling at step 611. The IEEE 802.16m BS having received the registration accept message from the target base station (Target-BS) attaches an IEEE 802.16m MAC header to the received registration accept message at step 612, and transmits the resultant registration accept message to the mobile station (MS) at step 613.

The mobile station (MS) having received the registration accept message removes a header at step 614, and transmits a pre-registration complete information REQ primitive to the target network protocol at step 615. The target network protocol having received the primitive transmits a pre-registration complete info CNF primitive to the 16 m protocol at step 616.

The mobile station (MS) attaches the IEEE 802.16m MAC header and an Inter-RAT extended subheader to the registration complete message at step 617, and transmits the registration complete message to the target base station (Target-BS) via the L2 tunneling at step 618.

A method for defining a structure of a message transferred via the L2 signal tunneling and then correcting a conventional message used for a handover will hereinafter be described in detail. An Inter-RAT extended subheader added to the L2 tunneling message enables the mobile station (MS) to perform a rapid and reliable handover.

Figure 7:
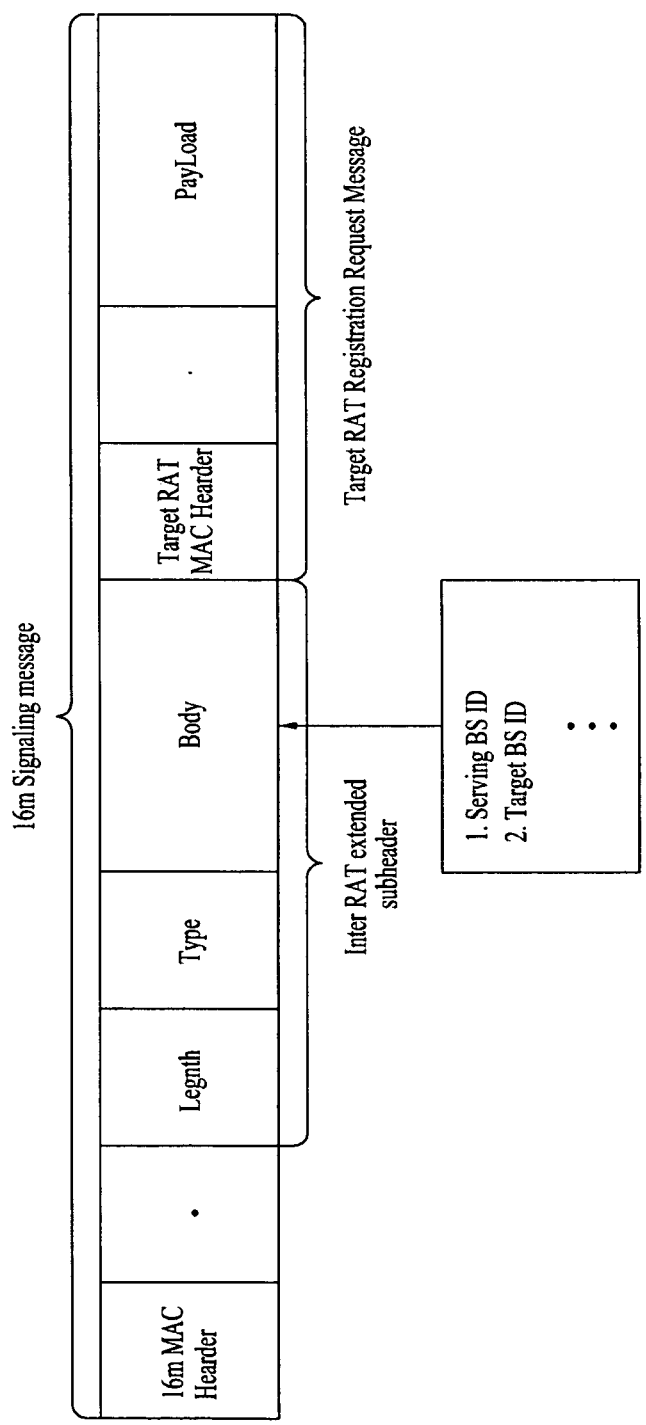
FIG. 7 exemplarily shows a registration request message transmitted via an L2 tunneling by a mobile station (MS) in order to perform pre-registration with a target base station according to the present invention.

FIG. 7 exemplarily shows a registration request message transmitted via an L2 tunneling by a mobile station (MS) in order to perform pre-registration with a target base station according to the present invention.

Referring to FIG. 7, an IEEE 802.16m MAC header and an Inter-RAT extended subheader are added to a target-RAT registration request message and the target-RAT registration request message is transferred to the target base station (Target-BS). In this case, the Inter-RAT extended subheader contains available information which can be used for performing a handover after performing pre-registration between the mobile station (MS) and the target base station.

Specific information capable of being contained in the Inter-RAT extended subheader may include a serving BS ID, a target BS ID, etc. The IEEE 802.16m BS having received the registration request L2 signaling message from the mobile station (MS) confirms a target BS ID of an Inter-RAT extended subheader, and forwards the message to an intermediate node of a corresponding RAT. In this case, the intermediate node including the IEEE 802.16m BS does not confirms the registration request message. The intermediate node having received the message confirms a target BS ID of the Inter-RAT extended subheader, and transmits the message to the next intermediate node such that the corresponding message can be transferred to the target BS. As a result, the corresponding message is finally transferred to the target BS.

The target BS having received the message confirms the registration request message. Then, if the authentication between the mobile station (MS) and the authentication server is completed, the target BS prepares a registration accept message. Also, the target BS confirms a type of an Inter-RAT extended subheader and serving BS ID information, and may include information available for a handover of a corresponding MS in the registration accept message.

Figure 8:
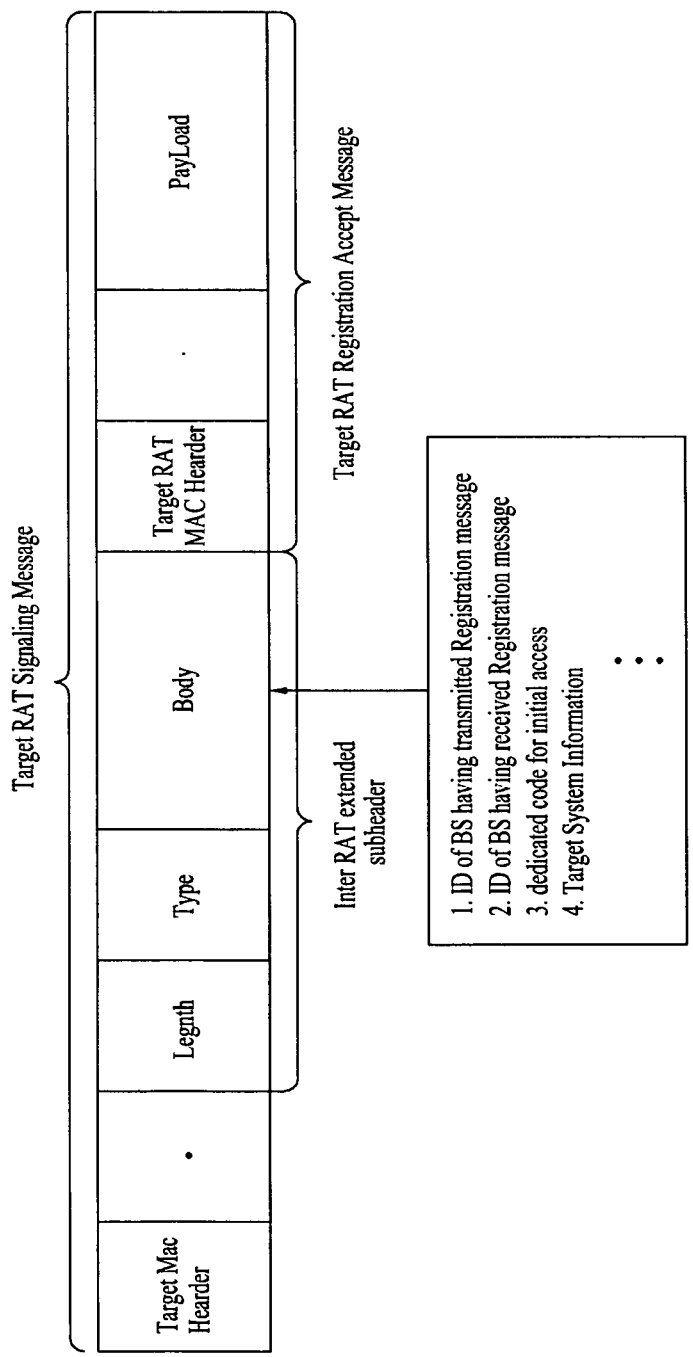
FIG. 8 exemplarily shows an L2 signaling message for allowing a target base station having received a registration request message to transfer a registration accept message to a mobile station (MS) according to the present invention.

FIG. 8 exemplarily shows an L2 signaling message which is prepared by a target BS having received the registration request message for transferring the registration accept message to the mobile station (MS) according to the present invention.

Referring to FIG. 8, a target-RAT MAC header and an Inter-RAT extended subheader are added to a target-RAT registration accept message and the target-RAT registration accept message is transferred to the mobile station (MS). In addition, an ID of a BS having transmitted the registration request message, an ID of a BS having received the registration request message (i.e., an ID of a BS which will transmit the registration accept message), a dedicated code, and target system information are included in the Inter-RAT extended subheader field. In this case, the dedicated code contained in the Inter-RAT extended subheader may be used when the mobile station (MS) performs an initial access to the target BS. In other words, the mobile station (MS) attempts to perform the access using the dedicated code received from the target BS, such that it may avoid colliding with other mobile stations (MSs) attempting to access the target BS. Also, if the mobile station (MS) performs a handover to the target BS or attempts to access the target BS, it may effectively use target system information (e.g., physical information and radio bearer information) of the Inter-RAT extended subheader contained in the registration accept message, which has been transferred from the target BS to the mobile station (MS). Specifically, the mobile station (MS) can effectively use corresponding information of the Inter-RAT extended subheader during a handover to the pre-registered BS.

Figure 9:
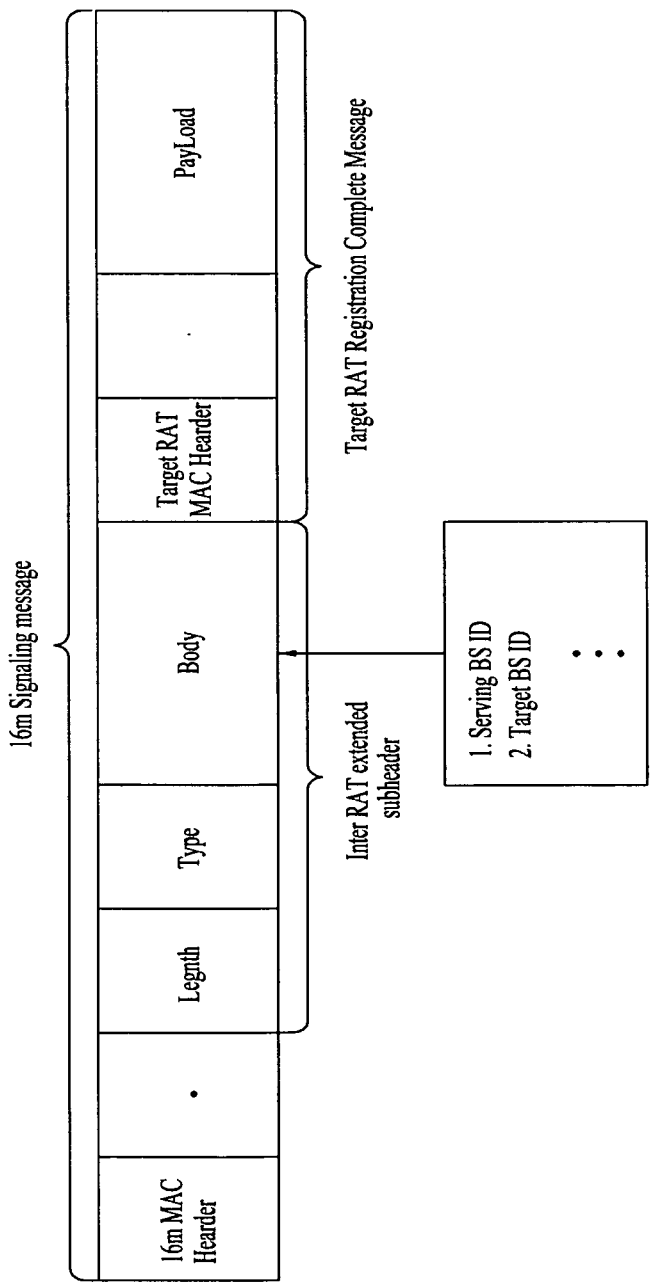
FIG. 9 exemplarily shows an L2 signaling message for allowing a mobile station (MS) having received a registration accept message to transfer a registration complete message to a target base station according to the present invention.

FIG. 9 exemplarily shows an L2 signaling message which is prepared by a mobile station (MS) having received the registration accept message, for transferring a registration complete message to a target BS according to the present invention. As described above, the mobile station (MS) adds the IEEE 802.16m MAC header and the Inter-RAT extended subheader to the registration complete message, and transmits the resultant registration complete message to the target BS.

Table 1 exemplarily shows a format of an Inter-RAT extended subheader. As can be seen from Table 1, the Inter-RAT extended subheader includes a length field, a type field, and a body field.

TABLE 1

| Name | Length (bit) | Description |
| --- | --- | --- |
| Length | 8 | The extended subheader length field indicates the total length of the subheader |
| Type | 7 | Type of subheader (Refer to Table 2) |
| Body | Variable | Include the various information for handover of MS |

The following Table 2 represents a type of a subheader which can be added to an IEEE 802.16m general MAC header. 128 extended subheaders may be added to the IEEE 802.16m general MAC header. The embodiments of the present invention may newly define extended header types for supporting the Inter-RAT handover. Also, the same extended subheader types as those of Table 2 may also be defined even when the target BS transmits the L2 tunneling message to the mobile station (MS).

TABLE 2

| Extended Subheader Type | Name |
| --- | --- |
| 0 | Inter-RAT Extended Subheader |
| 1~127 | Reserved |

The embodiments of the present invention may correct some legacy messages among messages transmitted/received while the mobile station (MS) performs an Inter-RAT handover to the target cell.

The following Table 3 exemplarily shows an MOB_NBR-ADV message transferred from the BS to the MS. As can be seen from Table 3, the MOB_NBR-ADV message may include a neighbor cell ID for each RAT ID.

TABLE 3

| Syntax | Size (bit) | Notes |
| --- | --- | --- |
| MOB_NBR-ADV_Message_format( ) { | — | — |
| Management Message Type = Undecided | 8 | — |
| Skip-optional-fields bitmap | 8 | Bit[0]: if set to 1, omit Operator ID field<br>Bit[1]: if set to 1, omit NBR BS ID field<br>Bit[2]: if set to 1, omit HO process optimization field<br>Bit[3]: if set to 1, omit QoS related fields<br>Bit[4]-[7]: Reserved |
| If (Skip-operational-fields-[0]=0{ | — | — |
| Operator ID | 24 | Identifier of the network provider |
| } | — | — |
| Configuration Change count | 8 | Incremented each time the information for the associated neighbor BS has changed |
| Fragmentation Index | 4 | Indicates the current fragmentation index |
| Total Fragmentation | 4 | Indicates the total number of fragmentation |
| RAT ID (Embodiment 1) | 8 | 1 indicates support, 0 indicates no support:<br>Bit #0: 802.16<br>Bit #1: 802.11<br>Bit #2: 802.15<br>Bit #3: GERAN(GSM/GPRS/EGPRS)<br>Bit #4: UTRAN<br>Bit #5: E-UTRAN<br>Bit #6: CDMA2000<br>Bit #7: Reserved, set to zero |
| RAT ID (Embodiment 2) | 8 | IEEE 802.16 can be omitted at RAT ID in consideration of communication messages of IEEE 802.16 network (In case of using the following RAT ID, message format after RAT ID contained in message |

TABLE 3-continued

| Syntax | Size (bit) | Notes |
| --- | --- | --- |
| | | can be changed) 1 indicates support, 0 indicates no support: Bit #0: 802.11 Bit #1: 802.15 Bit #2: GERAN(GSM/GPRS/EGPRS) Bit #3: UTRAN Bit #4: E-UTRAN Bit #5: CDMA2000 Bit #6-7: Reserved, set to zero |
| If (RAT ID[0] == 1) { 16_N_NEIGHBORS | 8 | — |
| For(j=0;   j<16_N_NEIGHBORS; j++){ | — | — |
| Length | 8 | Length of message information including all fields within the FOR loop |
| PHY Profile ID | 8 | Aggregated identifiers of co-located FA indicator, FA configuration indicator, FFT size, bandwidth operation mode of the starting subchannelization of a frame, and channel number |
| ~Same as legacy 16e message ~Omission   If (Skip-operational-field[1]=0){   Neighbor BSID   } ~Omission } } // End of RAT ID[0] ~ ~ // repeat until RAT ID [7] If (RAT ID [7] ==1{ Other_RAT_N_NEIGHBORS | 8 | — |
| For(j=0; j<Other_RAT_N_NEIGHBORS; j++){ | — | |
| Length | 8 | Length of message information including all fields within the FOR loop |
| PHY Profile ID | 8 | Aggregated identifiers of co-located FA indicator, FA configuration indicator, FFT size, bandwidth operation mode of the starting subchannelization of a frame, and channel number |
| ~Same as legacy 16e message ~Omission   If (Skip-operational-field[1]=0){   Neighbor BSID   } ~Omission } } // End of RAT ID[7] BS ID | 8 | |
| } ~ Same as legacy message TLV Encoded Neighbor Information } }//End of MOB_NBR-ADV | Variable | TLV-specific |

The Extended_MOB_NBR-ADV message is a broadcast message for allowing the IEEE 802.16m BS to transmit information of Inter-RAT BSs to the mobile station (MS), and may have a duration longer than that of an IEEE 802.16e MOB_NBR-ADV message. The Extended_MOB_NBR-ADV message may be adapted to reduce overhead of a periodical broadcast message when a frequency of the Inter-RAT handover is less or higher than that of the Intra-RAT handover.

As shown in the following Table 4, the Extended_MOB_NBR-ADV message includes peripheral Inter-RAT BS information for the Inter-RAT handover. For example, the Extended_MOB_NBR-ADV message includes physical parameters. Also, a format of a broadcast message having various durations may be extended to other usages according to contents contained in the broadcast message.

TABLE 4

| Syntax | Size (bit) | Notes |
|---|---|---|
| Extended_MOB_NBR-ADV_Message_format( ) { | — | — |
| Management Message Type = Undecided | 8 | — |
| Ext-Support-fields bitmap | 8 | Bit[0]: if set to 1, support pre-registration<br>Bit[1]-[7]: Reserved |
| N_NEIGHBORS | 8 | Number of Inter-RAT neighbors |
| For ( j = 0; j< N_NEIGHBORS; j++) { | — | — |
| Length | 8 | Length of message information including all fields within the FOR loop |
| RAT ID | 8 | 1 indicates support, 0 indicates no support:<br>Bit #0: 802.11<br>Bit #1: 802.15<br>Bit #2: GERAN(GSM/GPRS/EGPRS)<br>Bit #3: UTRAN<br>Bit #4: E-UTRAN<br>Bit #5: CDMA2000<br>Bit #6-7: Reserved, set to zero<br>Representable by RAT ID of Embodiment 2 of Table 3 |
| If (Ext-Support-fields [0] = 1) {<br>Pre-registration supported<br>} | | |
| PHY Profile ID | | Various physical parameters provided from corresponding BS can be contained, for example, channel number, BSSID, cell identifier, etc. |
| }<br>TLV Encoded Neighbor Information | Variable | TLV-specific |
| }<br>}//End of Extended_MOB_NBR-ADV | | |

Neighbor information of Tables 3 and 4 may be broadcasted in the form of a message via a DL subframe predetermined for allowing the IEEE 802.16m system to pre-transmit neighbor information.

The following Table 5 exemplarily shows a structure of the MOB_SCN-REQ message, which is transferred from the mobile station (MS) to the serving BS in order to request the neighbor cell scanning.

TABLE 5

| Syntax | Size (bit) | Notes |
|---|---|---|
| MOB_SCN-REQ_Message_format( ) { | — | — |
| Management Message Type = Undecided | 8 | — |
| Scan duration | 8 | Units are in frames |
| Interleaving interval | 8 | Units are frames |
| Scan Iteration | 8 | — |
| RAT ID | 8 | 1 indicates support, 0 indicates no support:<br>Bit #0: 802.16<br>Bit #1: 802.11<br>Bit #2: 802.15<br>Bit #3: GERAN(GSM/GPRS/EGPRS)<br>Bit #4: UTRAN<br>Bit #5: E-UTRAN<br>Bit #6: CDMA2000<br>Bit #7: Reserved, set to zero<br>Representable by RAT ID of embodiment 2 of Table 3 |
| If (RAT ID[0] == 1 {<br>16_N_recommended_BS_Index | 8 | Number of neighboring BS to be scanned or associated, which are using BS index that corresponds to the position of BS in MOB_NBR-ADV message |
| If(16_N_Recommend_BS_Index !=0){<br>Configuration change count for MOB_NBR-ADV | 8 | Configuration Change Count Value of referring MOB_NBR-ADV message |
| } | — | — |

TABLE 5-continued

| Syntax | Size (bit) | Notes |
| --- | --- | --- |
| For (j = 0; j< N_Recommended_BS index; j++){ | — | — |
| Neighbor_BS_Index | 8 | 16 m BS index corresponds to position of BS in MOB_NBR-ADV message |
| Reserved | 1 | Shall be set to zero |
| Scanning type | 3 | 0b000: Scanning without association<br>0b001: Scanning with association level0: association without coordination<br>0b010: Scanning with association level 1: association with coordination<br>0b011: Scanning with association level 2: Network assisted association<br>0b100-0b111: Reserved |
| } | — | — |
| 16_N_Recommended_BS_Full | 8 | Number of neighboring BS to be scanned or associated, which are using full 48 bits BS ID |
| For (j = 0; j< N_Recommended_BS_Full; j++){ | — | — |
| Recommended BS ID | 48 | — |
| Reserved | 1 | Shall be set to 0 |
| Scanning type | 3 | 0b000: Scanning without association<br>0b001: Scanning with association level 0: association without coordination<br>0b010: Scanning with association level 1: association with coordination<br>0b011: Scanning with association level 2: Network assisted association<br>0b100-0b111: Reserved |
| } | — | — |
| } | — | — |
| ~Perform until RAT ID[7] If(RAT ID[7] ==1){ | | |
| Other_RAT_N_recommended_BS_index | 8 | Other_RAT_N_recommended_BS_index is represented by CDMA2000_N_recommended_BS_Index if RAT ID is exemplarily set to 6. Number of neighboring BS to be scanned, which are using BS index that corresponds to the position of BS in MOB_NBR-ADV message |
| If(Other_RAT_N_Recommend_BS_Index !=0){ | — | — |
| Configuration change count for MOB_NBR-ADV | 8 | Configuration Change Count value of referring MOB_NBR-ADV message |
| } | — | — |
| For (j = 0; j< Other_RAT_N_Recommended_BS_Index ; j++){ | — | — |
| Neighbor_BS_Index | 8 | Other RAT BS index corresponds to position of BS in MOB_NBR-ADV message |
| Reserved | 1 | Shall be set to zero |
| } | | |
| Padding | Variable | If needed for alignment to byte boundary |
| TLV encoded information | Variable | — |
| } //End of MOB_SCAN-REQ | — | — |

A scanning response message (MOB_SCN-RSP) is a response to the MOB_SCN-REQ message received from the mobile station (MS). In order to support Inter-RAT Cell selection/Reselection/handover by using a message transferred to the mobile station (MS), the BS determines a recommended BS on the basis of position information of the mobile station (MS) as shown in the following Table 6, and includes information of the recommended BS in the MOB_SCN-RSP message. In other words, the BS determines an optimum neighbor node to be scanned by the MS on the basis of LBS information (e.g.; DL/UL TDOA and TOA) transferred from the MS, and informs the MS of the determined optimum neighbor node.

The following Table 6 represents some parts of the MOB_SCN-RSP message including the recommend BS information.

TABLE 6

| Syntax | Size (bit) | Notes |
| --- | --- | --- |
| MOB_SCN-RSP_Message_format( ) { | — | — |
| Management Message Typ = | 8 | — |

TABLE 6-continued

| Syntax | Size (bit) | Notes |
|---|---|---|
| Undecided | | |
| Scan duration | 8 | Units are in frames |
| Report mode | 2 | 0b00: No report<br>0b01: Periodic report<br>0b10: Event-triggered report<br>0b11: Reserved |
| Reserved | 6 | Shall be set to zero |
| Report period | 8 | If ReportMode is set to 0b01, this is the Report Period, in frames; Otherwise this field is set to 0 |
| Report metric | 8 | Bitmap indicating metrics on which the corresponding triggers are based:<br>Bit 0: BS CINR mean<br>Bit 1: BS RSSI mean<br>Bit 2: Relative delay<br>Bit 3: BS RTD; this metric shall be only measured on serving BS/anchor BS<br>Bit 4-7: Reserved; shall be set to zero |
| ~ | | |
| If (Scan Duration !=0{ | — | — |
| Start frame | 8 | — |
| Interleaving interval | 8 | Duration in frames |
| Scan iteration | 8 | — |
| RAT ID | 8 | 1 indicates support, 0 indicates no support:<br>Bit #0: 802.16<br>Bit #1: 802.11<br>Bit #2: 802.15<br>Bit #3: GERAN(GSM/GPRS/EGPRS)<br>Bit #4: UTRAN<br>Bit #5: E-UTRAN<br>Bit #6: CDMA2000<br>Bit #7: Reserved, set to zero<br>Representable by RAT ID of embodiment 2 of Table 3 |
| If (RAT ID[0] == 1 { | | |
| N_Recommended_BS index | 8 | Number of neighboring BS to be scanned or associated, which are using BS index that corresponds to the position of BS in MOB_NBR-ADV message |
| Configuration change count for MOB_NBR_ADV<br>}<br>For (j = 0; j< N_Recommended_BS_Index; j++){ | 8 | |
| Neighbor_BS_Index | 8 | BS index corresponds to position of BS in MOB_NBR-ADV message |
| Unit scan duration | | Unit duration allocated for at least one scan, which may be a frame unit or sub-frame unit according to 16 m frame structure |
| Scan iteration | | Different iterations may be allocated according to intention of BS for each RAT |
| ~ // Omission<br>}// End of RAT ID[0] | | |
| RAT ID[1] ~ [7] Perform 'If statesments'<br>// End of RAT ID [7] | | Including recommended BS index for each RAT ID, similar to RAT ID [0].<br>Unit scan duration and Scan iteration may be differently allocated to individual RAT IDs |
| Padding | Variable | If needed for alignment to byte boundary |
| }//End of Scan Duration | | |
| TLV encoded information | Variable | — |
| }//End of MOB_SCN-RSP message | — | — |

The following Table 7 exemplarily shows a scanning report (MOB_SCN-REP) message transferred from the mobile station (MS) which reports the scanning result of the Inter-RAT neighbor cell to the serving BS.

TABLE 7

| Syntax | Size (bit) | Notes |
|---|---|---|
| MOB_SCN-REP_Message_format( ) { | — | — |
| Management Message Type = 60 | 8 | |
| Scan Identity | 8 | A reference number that is used for modification of MOB_NBR-ADV message |
| Report mode | 1 | 0: Event-triggered report<br>1: Period report |
| RAT ID | 8 | 1 indicates support, 0 indicates no support:<br>Bit #0: 802.16<br>Bit #1: 802.11<br>Bit #2: 802.15<br>Bit #3: GERAN(GSM/GPRS/EGPRS)<br>Bit #4: UTRAN<br>Bit #5: E-UTRAN<br>Bit #6: CDMA2000<br>Bit #7: Reserved, set to zero<br>Representable by RAT ID of embodiment 2 of Table 3 |
| If (RAT ID[0] = = 1 {<br>N_current_BSs | 3 | The number of Recommended cells contained in MOB_SCN_RSP message for each RAT ID |
| Report metric | 8 | Bitmap indication presence of certain metrics (threshold values) on which the corresponding triggers are based:<br>Bit 0: BS CINR mean<br>Bit 1: BS RSSI mean<br>Bit 2: Relative delay<br>Bit 3: BS RTD; this metric shall be only measured on serving BS/anchor BS<br>Bit 4-7: Reserved; shall be set to zero |
| For(j=0;j<N_current_BSs;j++){<br>Report (e.g., RSSI or CINR, etc) according to Report metric<br>~Omission<br>~~Perform until RAT ID[7]<br>}//End of If (RAT ID[7] ==1)<br>TLV encoded information<br>} //End of MOB_SCN-REP_Message | Variable | Optional |

Under a single mode, the MS cannot communicate with at least two Inter-RATs at the same time. Therefore, in order to communicate with the Inter-RATs, the MS must momentarily stop communicating with a current connection network, and must then switch a network interface to another. Otherwise, in case of another MS capable of supporting a multi-mode, this MS can communicate with at least two Inter-RATs at the same time, such that it can communicate with the Inter-RATs, irrespective of a communication mode with a current connection network. In this case, the MS need not switch an interface of the current connection network.

Therefore, if information of a mode supported by the MS and type information of a network capable of operating the MS are reported to the BS, the BS can definitely carry out processes associated with Inter-RAT communication, for example, a process for allocating a scan duration.

The following Table 8 represents specific information which can be contained in SBC-REQ/RSP messages transferred to the BS when the MS enters the network.

TABLE 8

| Name | Type | Length | Value | Scope |
|---|---|---|---|---|
| Mode Selection Capability | xx | 1 | Bit 0: This bit describes the capability to support signal mode concept in case Inter-RAT handover<br>Bit 1: This bit describes the capability to support multi-mode concept in case Inter-RAT handover<br>Bit 2-7: Reserved, set to zero | SBC-REQ |
| Supported Inter-RAT type | yy | 1 | 1 indicates support, 0 indicates no support:<br>Bit #0: 802.16 | SBC-REQ/RSP<br>In case of |

TABLE 8-continued

| Name | Type | Length | Value | Scope |
|------|------|--------|-------|-------|
| | | | Bit #1: 802.11<br>Bit #2: 802.15<br>Bit #3: GERAN(GSM/GPRS/EGPRS)<br>Bit #4: UTRAN<br>Bit #5: E-UTRAN<br>Bit #6: CDMA2000<br>Bit #7: Reserved, set to zero<br>Representable by RAT ID of embodiment 2 of Table 3 | SBC-REQ, type of network supported by MS is decided. In case of SBC-RSP, network type supported by BS is decided |

If a channel measurement value of the Inter-RAT BS is higher than that of the IEEE 802.16m serving BS during a given time duration, or if a channel measurement value of a neighboring Inter-RAT BS is higher than an Inter-RAT HO threshold value acting as an absolute value during a given time duration, the IEEE 802.16m MS begins to perform an Inter-RAT handover.

The following Table 9 exemplarily shows contents, which are added to a DCD to express a condition needed for the beginning of a handover. That is, the following Table 9 shows an example of a DCD Trigger TLV description field.

TABLE 9

| Name | Length (bit) | Value |
|------|--------------|-------|
| Type | | |
| Function | 1 | Computation defining trigger condition:<br>0x0: Reserved<br>0x1: Metric of neighbor BS is greater than absolute value<br>0x2: Metric of neighbor BS is less than absolute value<br>0x3: Metric of neighbor BS is greater than serving BS metric by relative value<br>0x4: Metric of neighbor BS is less than serving BS metric by relative value<br>0x5: Metric of serving BS greater than absolute value<br>0x6: Metric of serving BS less than absolute value |
| Actions | 1 | Action performed upon reaching trigger condition:<br>0x0: Reserved<br>0x1: Respond on trigger with MOB_SCN-REP after the end of each scanning interval<br>0x2: Respond on trigger with MOB_MSHO-REQ<br>0x3: On trigger, MS starts neighbor BS scanning process by sending MOB_SCN-REQ, by initiating autonomous neighbor cell scanning or both<br>0x4: On trigger, MS starts Inter RAT neighbor BS scanning process by sending MOB_SCN-REQ<br>0x5: On trigger, MS starts Inter RAT handover by sending MOB_SCN-REQ<br>0x6-0x7: Reserved |

If a multi-interface MS supporting the single mode searches for an Inter-RAT BS other than the current connection BS or desires to communicate with the Inter-RAT BS, a time consumed for changing a current RF interface to another is pre-notified as a switching duration denoted by a DCD value to the MS. Also, unit scan duration information for each RAT may also be notified to the MS.

The following Table 10 shows an example of the switching duration for DCD channel encodings and an example of the unit scan duration.

TABLE 10

| Name | Type | Length | Value | PHY scope |
|------|------|--------|-------|-----------|
| Switching duration | xx | 1 | This value is for the single mode MS to switch its RF to others | OFDMA |
| Unit scan duration | yy | 1 | This value is for the single mode MS to scan each neighbor inter-RAT BSs | OFDMA |

The mobile station (MS) recognizes that there are no UL/DL traffics associated with the IEEE 802.16m BS during the durations. The MS may omit a DL channel monitoring process during the durations.

The switching duration is used when the BS allocates a scanning duration to the MS using the MOB_SCN-RSP message transferred from the BS to the MS, wherein the scanning duration is used for the scanning process of each Inter-RAT neighbor cell. This switching duration may be a minimum unit of the scanning duration allocated to individual Inter-RATs (e.g., GERAN, UTRAN, and E-UTRAN).

Figure 10:
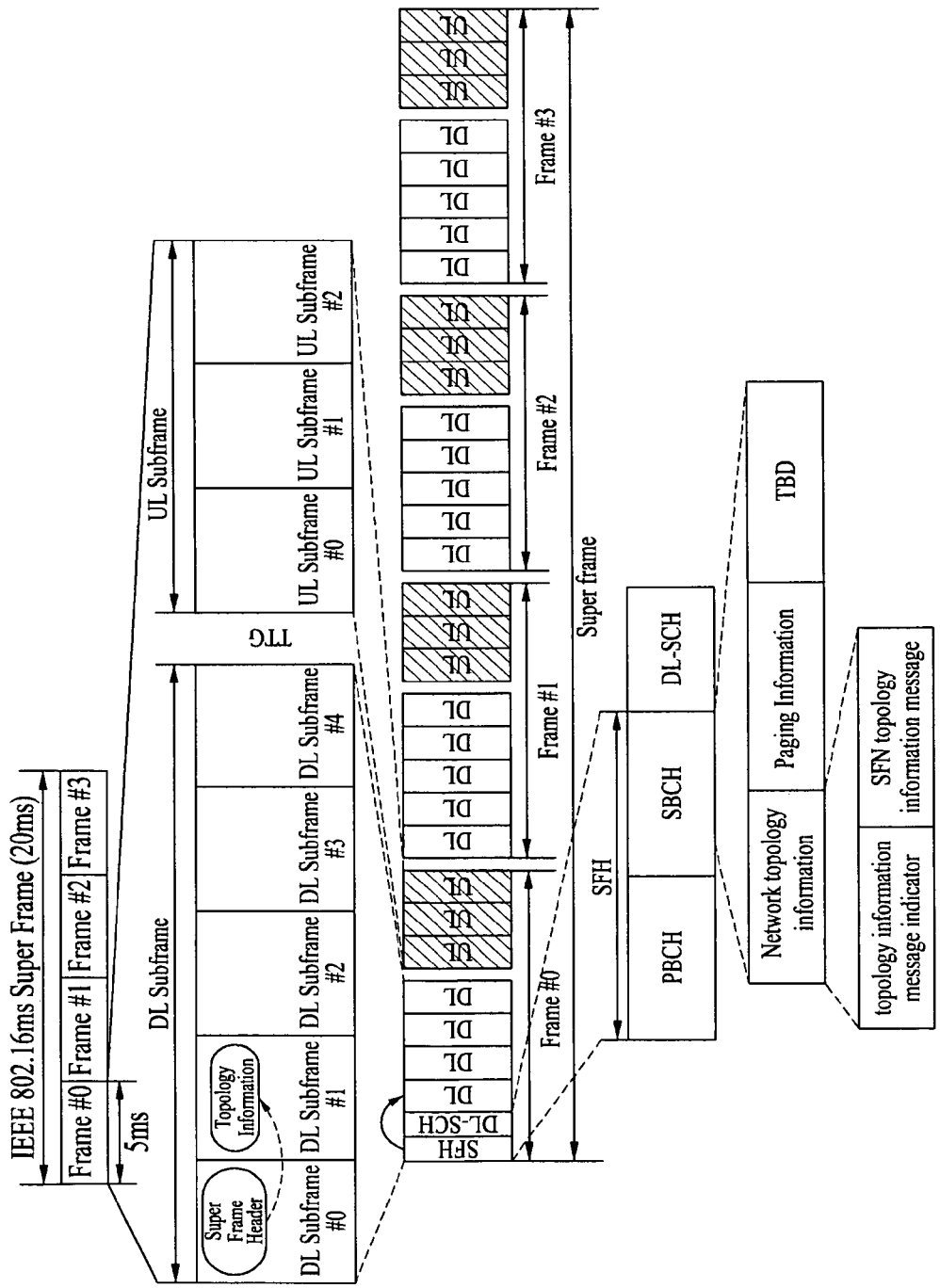
FIG. 10 exemplarily shows a frame structure for transferring an Extended neighbor advertisement (Extended_MOB_NBR-ADV) message according to the present invention.

FIG. 10 exemplarily shows a frame structure for transferring an Extended_ MOB_NBR-ADV message according to the present invention.

In case of using the frame structure of FIG. 10, the IEEE 802.16m system can effectively transfer the Extended_ MOB_NBR-ADV message for supporting the above-mentioned Inter-RAT handover.

As shown in FIG. 10, the IEEE 802.16m super frame is constructed in units of 20 ms, and is divided into four frames. Each frame is divided into five DL subframes and three UL subframes. A Super Frame Header (SFH) may be located at a first DL subframe of the IEEE 802.16m super frame, and the super frame header may include a broadcast channel and a DL Shared Channel (DL-SCH). Also, the broadcast channel may be divided into a primary BCH (PBCH) and a secondary BCH (SBCH). The PBCH may include broadcast information which is common to a network, and the SBCH may include broadcast information which is specific to each cell. The MOB_NBR-ADV message used for supporting the Inter-RAT handover can be transferred to the MS according to the following method.

As can be seen from FIG. 10, a topology information indicator flag may be applied to this SBCH, wherein the topology information indicator flag indicates whether topology information (i.e., Extended_MOB_NBR-ADV message) for the Inter-RAT handover is contained in a corresponding 802.16m super frame. If the MS checks this flag and the presence of topology information is determined, a start frame number (SFN) having the topology information message can be recognized by an 'SFN of topology information message' field. Otherwise, if the MS checks this flag and the absence of topology information is determined, it checks SBCH information in the next super frame such that it is able to receive topology information for the Inter-RAT handover.

According to another method for transmitting the topology information needed for the Inter-RAT handover to the MS, contents of the topology information message are directly contained in the SBCH information, instead of indicating a DL subframe number having the topology information message, such that the resultant SBCH information may be transferred to the MS.

The topology information message may be a single message including both an Intra-RAT topology information message and an Inter-RAT topology information message. Otherwise, the Intra-RAT topology information message and the Inter-RAT topology information message are separated from each other, such that the separated information messages may be transferred to the MS separately from each other.

The IEEE 802.16m system may include various parameters needed for the handover (e.g., Intra-RAT handover and Inter-RAT handover) and the scanning in the SBCH information, such that it may transmit the resultant SBCH information. For example, the handover- and scanning-associated parameters capable of being contained in the SBCH information may be a handover trigger TLV, a scanning trigger TLV, and a pre-registration trigger TLV.

If the MS satisfies the trigger condition by including parameters of the following Table 11 in the SBCH information, the scanning, the pre-registration, and the handover can be supported.

TABLE 11

| Name | Length (bit) | Value |
|---|---|---|
| Type | | |
| Function | 1 | Computation defining trigger condition:<br>0x0: Reserved<br>0x1: Metric of neighbor BS is greater than absolute value<br>0x2: Metric of neighbor BS is less than absolute value<br>0x3: Metric of neighbor BS is greater than serving BS metric by relative value<br>0x4: Metric of neighbor BS is less than serving BS metric by relative value<br>0x5: Metric of serving BS greater than absolute value<br>0x6: Metric of serving BS less than absolute value |
| Actions | 1 | Action performed upon reaching trigger condition:<br>0x0: Reserved<br>0x1: Respond on trigger with MOB_SCN-REP after the end of each scanning interval<br>0x2: Respond on trigger with MOB_MSHO-REQ<br>0x3: On trigger, MS starts neighbor BS scanning process by sending MOB_SCN-REQ, by initiating autonomous neighbor cell scanning or both<br>0x4: On trigger, MS starts Inter RAT neighbor BS scanning process by sending MOB_SCN-REQ<br>0x5: On trigger, MS starts Inter RAT handover by sending MOB_SCN-REQ<br>0x6: On trigger, MS starts Inter RAT pre-registration process by sending MOB_SCN-REQ<br>0x7: Reserved |

A neighbor advertisement message indication field is used as an indication field, which informs the SBCH of the presence or absence of a neighbor advertisement message in corresponding super-frame duration of 20 ms.

'Intra scanning & handover Threshold' is contained in the SBCH, such that it can be recognized whether the MS satisfies a scanning or handover trigger condition by referring to the resultant SBCH.

An Inter RAT Scanning threshold, an Inter RAT Pre-registration threshold, and a Handover threshold are contained in the SBCH, such that it can be recognized whether the MS satisfies a scanning condition, a pre-registration condition, or a handover trigger condition by referring to the resultant SBCH.

An indication field of Pre-registration capability of other RAT networks may be added to the SBCH. If the MS decides to perform the pre-registration in an Inter-RAT by referring to the above indication field, it is able to scan only a network having the pre-registration function. This field is contained in a specific message having Inter-RAT information instead of the SBCH, such that the resultant specific message having this field may be transferred. In more detail, the above-mentioned field may be broadcast via a DL subframe predetermined as a message format including Inter-RAT information. If the above field is broadcast in the form of a message, this broadcast format may include all or some of Tables 3 and 4. If Intra-RAT neighbor information and Inter-RAT neighbor information are simultaneously transmitted, the format of Table 3 is used. If Intra-RAT neighbor information and Inter-RAT neighbor information are transmitted separately from each other, the Inter-RAT information may be broadcast using the format of Table 4.

In the meantime, a specific field indicating a handover (HO) type supported by the BS may be contained in the SBCH.

Although the present invention has been disclosed by referring to the above-mentioned embodiments, it should be noted that the aforementioned embodiments have been disclosed for only illustrative purposes, and those skilled in the art will appreciate that various modifications, additions and substitutions are possible, without departing from the scope and spirit of the invention as disclosed in the accompanying claims. Thus, it is intended that the present invention covers the modifications and variations of this invention provided they come within the scope of the appended claims and their equivalents.

As apparent from the above description, the present invention provides a method for performing a handover from the IEEE 802.16m network to a Non-802.16m network via a pre-registration and tunneling process.

INDUSTRIAL APPLICABILITY

The present invention is applicable an IEEE 802.16m, an Inter-RAT system connected to the IEEE 802.16m, and base stations and mobile stations of any system having a lower compatibility with the above IEEE 802.16m and Inter-RAT systems.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for supporting an Inter-RAT handover by an IEEE 802.16m mobile station comprising:
performing, by the mobile station, a pre-registration to a target base station of an Inter-RAT using a tunneling, if a channel quality value of an Inter-RAT neighbor cell is higher than a pre-registration threshold value; and
transmitting a handover request message for a handover to the target base station to a serving base station, if a channel quality value of the Inter-RAT neighbor cell is equal to or higher than a handover threshold value during a time duration in a scanning of the Inter-RAT neighbor cell and a channel quality value of the target base station is equal to or higher than that of the Inter-RAT neighbor cell,
wherein the performing of the pre-registration includes:
transmitting a registration request message to the target base station using the tunneling based on an L2 (second layer) protocol; and
transmitting a registration complete message to the target base station using the tunneling based on an L2 protocol, upon receiving a registration accept message from the target base station,
wherein the registration request message and the registration complete message are encapsulated with an Inter-RAT extended subheader and an IEEE 802.16m MAC header, wherein the Inter-RAT extended subheader includes an ID (identifier) of the serving base station and an ID of the target base station, and
wherein the handover threshold value is greater than the pre-registration threshold value.

2. The method of claim 1, further comprising:
transmitting a handover indication message to the serving base station, upon receiving a handover response message in response to the handover request message from the serving base station.

3. The method of claim 1, wherein the registration accept message is encapsulated with an Inter-RAT extended subheader and an IEEE 802.16m MAC header, wherein the Inter-RAT extended subheader includes an ID of the serving base station, an ID of the target base station, a dedicated code for an initial access, and system information of the target base station.

4. The method of claim 3, further comprising:
performing an initial access to the target base station using the dedicated code, if radio resources and a bearer of the IEEE 802.16m are released.

5. The method of claim 1, further comprising:
transmitting a handover request message for a handover to a base station having the highest channel quality value to the serving base station, if the channel quality value of the Inter-RAT neighbor cell is equal to or higher than the handover threshold value during a time duration in a scanning of the Inter-RAT neighbor cell and the channel quality value of the target base station is less than that of the Inter-RAT neighbor cell.

6. A method for supporting an Inter-RAT handover by an IEEE 802.16m mobile station comprising:
scanning an Inter-RAT neighbor cell by the mobile station, if a channel quality value of a serving base station is less than a scanning threshold value;
performing, by the mobile station, a pre-registration in a target base station of an Inter-RAT using a tunneling if a channel quality value of the Inter-RAT neighbor cell is higher than a pre-registration threshold value; and
transmitting a handover request message for a handover to the target base station to the serving base station, if a channel quality value of the Inter-RAT neighbor cell is equal to or higher than a handover threshold value during a time duration in a scanning of the Inter-RAT neighbor cell and a channel quality value of the target base station is equal to or higher than that of the Inter-RAT neighbor cell,
wherein the performing of the pre-registration includes:
transmitting a registration request message to the target base station using the tunneling based on an L2 (second layer) protocol; and
transmitting a registration complete message to the target base station using the tunneling based on an L2 protocol, upon receiving a registration accept message from the target base station, wherein the registration request message and the registration complete message are encapsulated with an Inter-RAT extended subheader and an IEEE 802.16m MAC header, wherein the Inter-RAT extended subheader includes an ID (identifier) of the serving base station and an ID of the target base station, and wherein the handover threshold value is greater than the pre-registration threshold value.

7. The method of claim 6, wherein the scanning includes:
receiving a neighbor advertisement message having recommended base station information which is decided by the serving base station on the basis of LBS (Location Based Service) information of the mobile station, from the serving base station; and scanning an Inter-RAT neighbor cell of the recommended base station information.

8. The method of claim 7, wherein the recommended base station information includes an ID of a neighbor base station for each RAT ID.

9. The method of claim 6, wherein the registration accept message is encapsulated with an Inter-RAT extended subheader and an IEEE 802.16m MAC header, wherein the Inter-RAT extended subheader includes an ID of the serving base station, an ID of the target base station, a dedicated code for an initial access, and system information of the target base station.

* * * * *